Patented May 4, 1954

2,677,705

UNITED STATES PATENT OFFICE 2,677,705

NEW AMIDES OF ALICYCLIC CARBOXYLIC ACIDS AND PROCESS FOR THEIR PRODUCTION

Gustav Eduard Utzinger, Basel, Switzerland

No Drawing. Application November 13, 1952,
Serial No. 320,339

4 Claims. (Cl. 260—557)

The literature describes various natural substances which show an activity toward small or microscopic organisms, as for instance, insects, worms or bacteria, such action being effected by attracting, killing or repelling the organisms. In these substances the active C—C-double plays an important role. Some times, those natural substances are combined with an amido group, for instance, in scabrine. Synthetic substances containing both of these characteristics, the active double bond and the amido group, are also mentioned in the patent literature. Thus, for instance, in the Swiss Patents Nos. 267,559, 267,580, crotonic acid amides and dimethyl acrylic acid amides are described, in which compounds the amine is aromatic, for example, N-alkyl-o-toluidine and the like. These are repellents, insecticides, insectifuges and fungicides.

It now has been found that amides of alicyclic acids with an active double bond, which are closer to the natural substances and are distinguished by greater compatibility with warmblooded animals, as compared with the already known aliphatic carboxylic acid amides, may be obtained by synthetic methods. With regard to their structure, they are closely related to the known ethereal oils which show an antiseptic and antihelmintic effect. My new synthetic substances correspond to the general formula

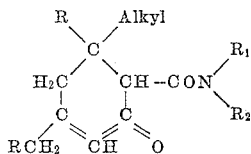

wherein R represents hydrogen atoms or alkyl radicals and $R_1$ and $R_2$ have the meaning of hydrogen atoms, alkyl, alkenyl, aryl or substituted aryl radicals.

This invention also relates to a process for the production of these new compounds. It has for its objects the new active substances, obtained according to the process of my invention, mixtures of such substances, as well as the use of these substances, singly, in mixtures, or in mixture with at least one carrier substance, as repellents, attractants, insectifuges, fungicides, antibiotics.

The process for the production of the new amides consists in the condensing Michael addition of an α-β unsaturated ketone of the formula

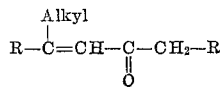

wherein R are substituents selected from the group consisting of hydrogen atoms and lower alkyl radicals, in the presence of an alkaline condensation medium, with an acylacetic acid amide of the formula

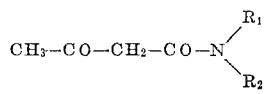

wherein $R_1$ and $R_2$ are substituents of the group consisting of hydrogen atoms, lower alkyl radicals, lower alkenyl radicals, monocyclic aryl radicals and monocyclic alkyl substituted aryl radicals. The process is preferably carried out in the presence of an alkaline condensation medium, for instance, in the presence of an alkali alcoholate.

For instance, the production of 3,5,5-trimethyl-cyclo - hexene (2) - on (1) carboxylic - acid - diethyl-amide (6) from acetoacetic-acid diethyl-amide and mesityl-oxide takes place as follows:

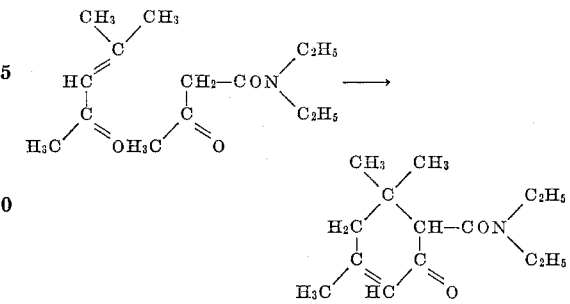

But the invention shall by no means be restricted to this example. Acyl-acetic-acid-amides with aromatic amines may also be condensed.

The substances obtained by this reaction constitute colorless aromatic crystals or viscous oils. The amide represented by the formula exists in 2 modifications having a melting point of 49 and 57°, respectively.

These active substances may be used as such or in admixture with other effective substances, or as a solution or in admixture with diluents in form of emulsions, dispersions, pastes, creams or aerosols.

*Example 1.* — *3,5,5-trimethyl-cyclo-hexene(2) on (1) carboxylic-acid-diethyl-amide (6)*

A solution of 17 gms. of sodium in 1000 ccs. of abs. ethanol is added to a mixture of 52 gms. of freshly distilled acetoacetic acid-N,N-diethyl-amide and 35 gms. of mesityl oxide. After three weeks' standing in a closed flask, the whole is heated for 30 minutes under reflux, afterwards the alcohol is distilled off to 200 ccs. and the remaining alcohol is removed in vacuo. The remaining red oil is cooled with ice, mixed with ether and poured into ice. The ethereal layer is separated and the solution twice extracted with ether.

Afterwards the washed and combined ethereal extractions are dried with sodium sulfate and after evaporation of the ether the remaining yellowish brown oil is distilled in high vacuo, whereby between 129° and 131° (0.1 mm.) the trimethyl-cyclo-hexene-carboxylic-acid-diethyl-amide is obtained as a slightly yellow oil.

The aqueous alkaline part is made acid to Congo paper with hydrochloric acid, extracted with ether, the ethereal solution is washed neutral with water and dried with sodium sulfate. After evaporation of the ether from this part at 75–85° (0.1 mm.) 23.8 gms. of the unreacted acetoacetic-acid-amide distilled off. Yield of cyclic amide: 26 gms.=61% of the theoretical yield after deduction of the regained acetoacetic-acid-amide. The yellow oil of the fraction 129 to 131° becomes solid on cooling with a freezing mixture and rubbing with a glass rod and after suspension in petroleum ether and recrystallisation from petroleum ether gives fine colorless crystals with the melting point 57–58°.

*Example 2.—3,5,5-trimethyl-cyclo-hexene(2)on-(1)-carboxylic-acid-N-ethyl-o-toluidide(6)*

This compound is prepared from mesityl oxide and acetoacetic acid-N-ethyl-N-o-toluidide in the same manner as indicated in Example 1. B. P. 0.05 mm., 150–157°, yellowish oil.

In an analogous manner may be obtained:

3,5,5-trimethyl-cyclo - hexene(2)on(1)carboxylic acid-dimethyl-amide(6)
3,5,5-trimethyl-cyclo - hexene(2)on(1)carboxylic acid-diallyl-amide(6)
3,5,5-trimethyl-cyclo - hexene(2)on(1)carboxylic acid-dibutyl-amide(6)

What I claim is:

1. New amides of alicyclic carboxylic acids of the general formula

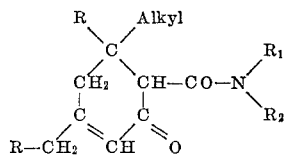

wherein R are substituents selected from the group consisting of hydrogen atoms and lower alkyl radicals, R₁ is a substituent selected from the group consisting of a hydrogen atom, a lower alkyl radical, and a lower alkenyl radical, and R₂ is a substituent selected from the group consisting of a hydrogen atom, a lower alkyl radical, a lower alkenyl radical, and a tolyl radical.

2. The new chemical compound of the formula

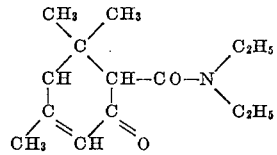

3. The new chemical compound of the formula

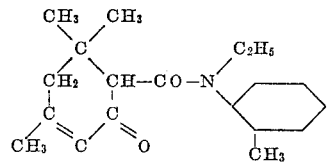

4. Process for the production of new amides of alicyclic-acids of the general formula

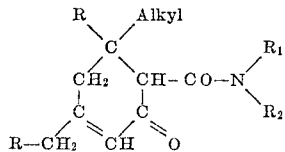

which comprises heating an α,β unsaturated aliphatic ketone of the formula

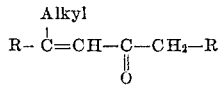

wherein R are substituents selected from the group consisting of hydrogen atoms and lower alkyl radicals, in the presence of an alkaline condensation medium, with an acylacetic acid amide of the formula

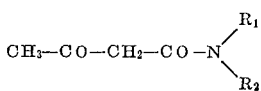

wherein R₁ is a substituent selected from the group consisting of a hydrogen atom, a lower alkyl radical, and a lower alkenyl radical, and R₂ is a substituent selected from the group consisting of a hydrogen atom, a lower alkyl radical, a lower alkenyl radical, and a tolyl radical.

No references cited.